US006965982B2

(12) United States Patent
Nemawarkar

(10) Patent No.: US 6,965,982 B2
(45) Date of Patent: Nov. 15, 2005

(54) MULTITHREADED PROCESSOR EFFICIENCY BY PRE-FETCHING INSTRUCTIONS FOR A SCHEDULED THREAD

(75) Inventor: Shashank Nemawarkar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 09/895,227

(22) Filed: Jun. 29, 2001

(65) Prior Publication Data

US 2003/0004683 A1   Jan. 2, 2003

(51) Int. Cl.$^7$ .............................................. G06F 9/312
(52) U.S. Cl. ..................................................... 712/207
(58) Field of Search ................................ 712/207, 205

(56) References Cited

U.S. PATENT DOCUMENTS

| | | | | |
|---|---|---|---|---|
| 5,361,337 A | * | 11/1994 | Okin ........................... | 712/228 |
| 5,809,450 A | | 9/1998 | Chrysos | |
| 5,907,702 A | * | 5/1999 | Flynn et al. ................. | 718/108 |
| 5,933,627 A | * | 8/1999 | Parady ........................ | 712/228 |
| 5,950,229 A | * | 9/1999 | Jeddeloh ..................... | 711/150 |
| 6,594,755 B1 | * | 7/2003 | Nuechterlein et al. ...... | 712/239 |

OTHER PUBLICATIONS

The Authoritive DIctionary on Standard IEEE Terms; IEEE Press; 2000; 7th Edition; p. 870.*

* cited by examiner

Primary Examiner—William M. Treat
(74) Attorney, Agent, or Firm—Casimer K. Salys; Dillon & Yudell LLP

(57) ABSTRACT

A method and processor architecture are provided that enables efficient pre-fetching of instructions for multi-threaded program execution. The processor architecture comprises an instruction pre-fetch unit, which includes a pre-fetch request engine, a pre-fetch request buffer, and additional logic components. A number of pre-defined triggers initiates the generation of a pre-fetch request that includes an identification (ID) of the particular thread from which the request is generated. Two counters are utilized to track the number of threads and the number of executed instructions within the threads, respectively. The pre-fetch request is issued to the lower level cache or memory and returns with a corresponding cache line, tagged with the thread ID. The cache line is stored in the pre-fetch request buffer along with its thread ID. When the particular thread later requires the instruction, the instruction is provided from within the pre-fetch request buffer at a shorter access latency than from the lower level cache or memory.

19 Claims, 7 Drawing Sheets

MULTITHREADED PROCESSOR EFFICIENCY BY PRE-FETCHING INSTRUCTIONS FOR A SCHEDULED THREAD

BACKGROUND OF THE INVENTION

1. Field of the Invention

The present invention generally relates to computer systems, and in particular to an instruction fetching within a processor of a data processing system. Still more particularly, the present invention relates to a method and system for providing efficient instruction pre-fetching for a multi-threaded program.

2. Description of the Related Art

The basic structure of a conventional computer system includes a system bus or a direct channel that connects one or more processors to input/output (I/O) devices (e.g., display monitor, keyboard and mouse), a permanent memory device for storing the operating system and user applications, and a temporary memory device that is utilized by the processors to execute program instructions.

When a user program is executed on a computer, the computer's operating system (OS) first loads the program files into system memory. The program files include data objects and instructions for handling the data and other parameters which may be inputted during program execution.

The operating system creates a process to run a user program. The process comprises a set of resources, including (but not limited to) values in RAM, process limits, permissions, registers, and at least one execution stream, which is commonly termed a "thread." The utilization of threads in user applications is well known. Threads allow multiple execution paths within a single address space to run on a processor. This process is called "multithreading" and increases throughput and modularity in both multiprocessor and uniprocessor systems. For example, if a first thread of an executing program has to wait for the occurrence of an event, then the processor halts its execution, and the computer processor executes another thread to prevent stoppages in processor operation and thus optimize utilization of processor resources. The event which causes a switching of the execution from one thread to another is typically a long latency operation, such as disk/remote memory access or producer-consumer type data exchange. In a multiprocessor computer system, multithreaded programs may exploit the availability of multiple processors by running different threads of the application program in parallel. The wait associated with long latency operations is masked by the computation performed on other threads available to the processor. Parallel execution reduces response time and improves throughput in multiprocessor systems.

In a superscalar processor operating at high frequencies, execution of a program typically involves pre-fetching of instructions from the memory or instruction cache to enable a continuous flow of instructions to the processor's execution units. Instructions are "pipelined" utilizing an instruction fetching unit (IFU) that is a hardware component of the processor. The operational characteristics of the IFU are dependent on changes to the flow of instruction execution due to branches, the depth of processing core, and the memory access latency to fetch the new sets of instructions. Further, the IFU is hardware extensive and is typically not scalable for high frequency processor designs. Also, current IFUs typically fetch instructions in a unithread fashion, i.e., fetch all instructions for a first thread before fetching the instructions for another thread. With the movement towards multithreaded programs and multiprocessor computer systems, this later characteristic of IFU operation, along with the other limitations, results in a dampening of overall processing efficiency and reduced throughput.

Typically, instruction pre-fetching is used on single-threaded executions. Given that a multi-threaded execution involves maintenance of separate (and at times shared) address space among threads, the single-threaded pre-fetching technique is not easily extended to execution of a multithreaded program. Two approaches to providing multithreaded architectures are the von Neumann execution based multithreading and the dataflow based multithreading. For dataflow based multithreading, all inputs of a thread are fetched before the execution on that thread commences. Thus, on a probable context switch a set of fetch operations are issued to bring the thread (code and data) to the on-chip caches, and the whole thread has to be brought in. This approach is very hardware and compiler intensive because there needs to be a mechanism to determine possible input sources of the thread, and all inputs have to arrive before a thread can be scheduled for execution. Also, the performance is inhibited because of the required synchronization to ensure that all input sources have been received. Such threads tend to be small, and the number of inputs for each thread is small as well to reduce the performance degradation. However, the simpler pre-fetching scheme cannot be easily extended to current multithreading operations.

Von Neumann execution based multithreading is exemplified by a Simultaneous Multithreading technique. This type of multithreading uses a program counter to track the program execution, and each thread is assumed independent of another. That is, benefits of warm caches (due to execution on one thread) on the execution on another thread are limited. Such multithreading can benefit from simple pre-fetching schemes. U.S. Pat. No. 5,809,450 offers one proposed pre-fetch scheme. According to patent, the latency of a remote memory access is calibrated using an on-chip performance measurement scheme and is utilized to insert the pre-fetches at empirically determined places in the code. This approach is also hardware extensive, and results vary with the configuration of the processor system due to changes in the memory and network access latencies.

The present invention recognizes that it would be desirable to have a method, system and processor that enables greater efficiency in handling execution of multithreaded programs. A method, system, and processor architecture that provides more efficient pre-fetching of instructions for multithreaded program execution would be a welcomed improvement. It would be further desirable to have such a method which was also scalable to adapt to higher frequency processor designs without requiring significant hardware upgrades. These and other benefits are provided in the present invention as described herein.

SUMMARY OF THE INVENTION

Disclosed is a method, system, and processor architecture that enables efficient pre-fetching of instructions for multi-threaded program execution in a data processing system. The processor architecture comprises an instruction pre-fetch unit that includes a pre-fetch request engine, a pre-fetch request buffer, and additional logic components for the correct implementation of a thread-identifiable pre-fetching scheme.

A number of pre-defined triggers initiates the generation of a pre-fetch request, which includes an identification (ID)

of the particular thread from which the request is generated. In a preferred embodiment, the tagging of the pre-fetch request for later identification of which thread the instruction belongs to is completed with the assistance of two counter mechanisms associated with the pre-fetch request engine which track the number of threads and the number of executed instruction within the threads, respectively.

The pre-fetch request is issued to the lower level cache or memory and returns with a corresponding cache line. The cache line is tagged with the thread ID. A comparison of the cache line address is made with any address in the IFAR, which has a miss in the instruction cache and, when the addresses match, the cache line is immediately provided to the processor execution units.

In the preferred embodiment, when the cache line returns, it is stored in the pre-fetch request buffer along with its thread ID. When the particular thread later requires the instruction, the instruction is provided from within the pre-fetch request buffer at a short access latency than if the instruction had to be fetched from the lower level cache or memory.

The above, as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
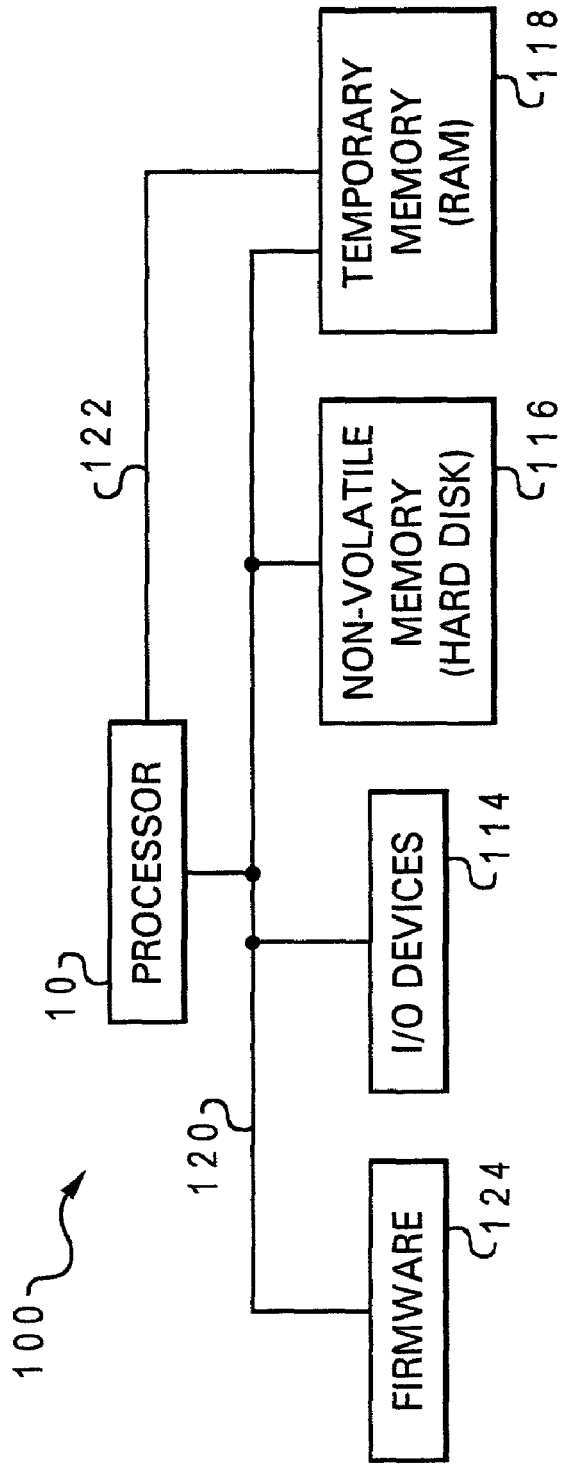
FIG. 1 is a block diagram of a conventional data processing system, which is utilized to implement multithread programming execution.

With reference now to the figures and in particular with reference to FIG. 1, there is illustrated a block diagram of the basic structure of a data processing system 100 utilized in the preferred embodiment of the invention. Data processing system 100 has at least one central processing unit (CPU) or processor 10 which is connected to several peripheral devices, including input/output devices 114 (such as a display monitor, keyboard, and graphical pointing device) for user interface, a non-volatile memory device 116 (such as a hard disk) for storing the data processing system's operating system and user programs/applications, and a temporary memory device 118 (such as random access memory or RAM) that is utilized by processor 10 to implement program instructions. Processor 10 communicates with the peripheral devices by various means, including a bus 120 or a direct channel 122 (more than one bus may be provided utilizing a bus bridge or a network of buses).

Those skilled in the art will further appreciate that there are other components that might be utilized in conjunction with those shown in the block diagram of FIG. 1; for example, a display adapter connected to processor 10 might be utilized to control a video display monitor, and a memory controller may be utilized as an interface between temporary memory device 118 and processor 10. Data processing system 100 also includes firmware 124 whose primary purpose is to seek out and load an operating system from one of the peripherals (usually permanent memory device 116) whenever the data processing system is first turned on. In the preferred embodiment, data processing system contains a relatively fast CPU or processor 10 along with sufficient temporary memory device 118 and space on permanent memory device 116, and other required hardware components necessary for providing efficient execution of instructions.

While an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution.

Figure 2:
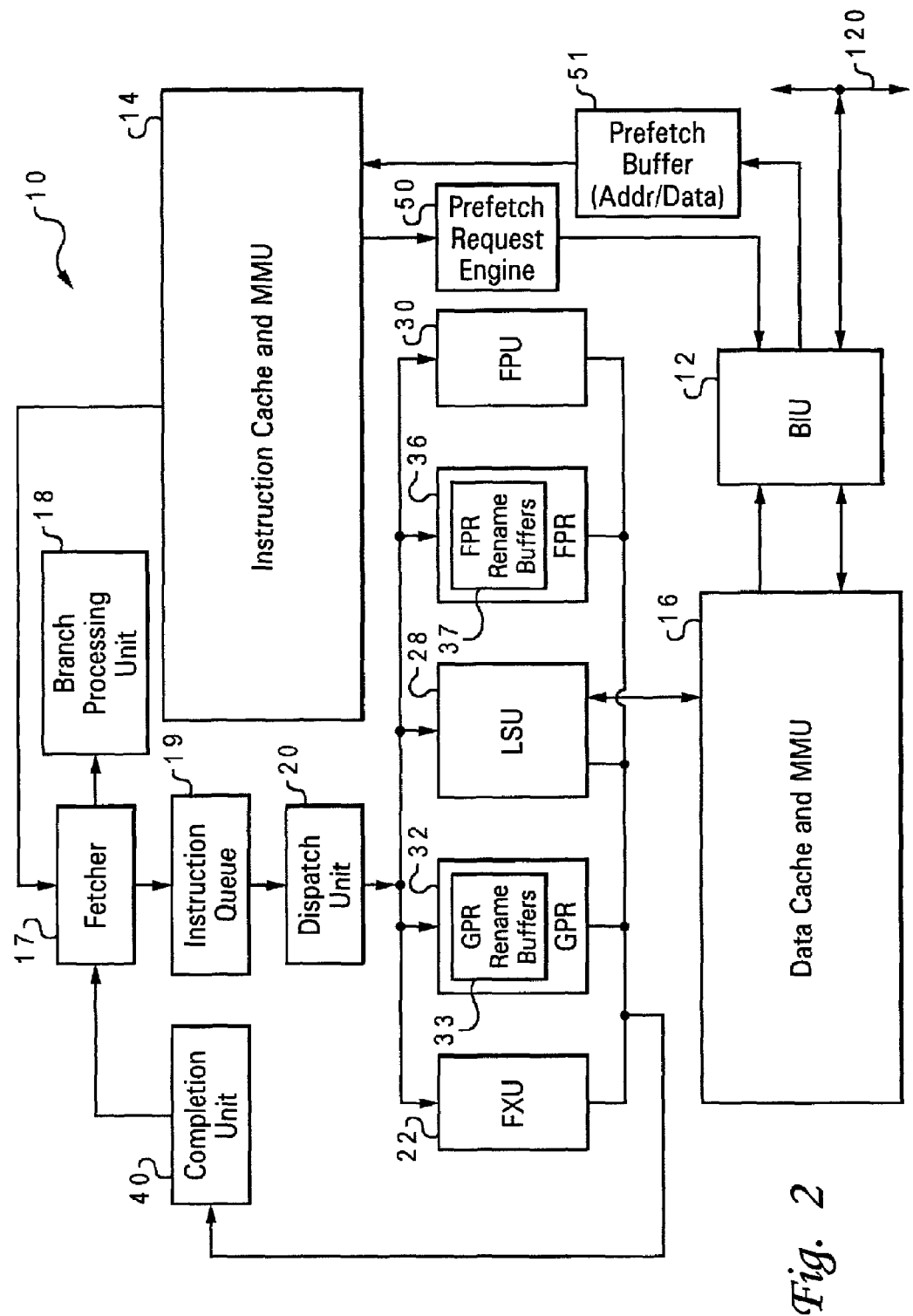
FIG. 2 is a block diagram depicting a modified processor design that includes additional logic for completing multi-threaded pre-fetching according to the present invention.

FIG. 2 is a block diagram of an exemplary processor 10 that is utilized for processing information according to a preferred embodiment of the present invention. Processor 10 may be located within data processing system 100 as depicted in FIG. 1. In the depicted embodiment, processor 10 comprises a single integrated circuit superscalar microprocessor. Accordingly, as discussed further below, processor 10 includes various execution units, registers, buffers, memories, and other functional units, which are all formed by integrated circuitry. In a preferred embodiment of the present invention, processor 10 comprises one of the PowerPC™ line of microprocessors, which operates according to reduced instruction set computing (RISC) techniques.

As depicted in FIG. 1, processor 10 is coupled to system bus 120 via a bus interface unit (BIU) 12 within processor 10. BIU 12 controls the transfer of information between processor 10 and other devices coupled to system bus 120 such as a main memory (not illustrated). Processor 10, system bus 120, and the other devices coupled to system bus 120 together form a data processing system.

BIU 12 is connected to instruction cache 14 and data cache 16 within processor 10. High speech caches, such as instruction cache 14 and data cache 16, enable processor 10 to achieve relatively fast access time to a subset of data or instructions previously transferred from main memory to instruction cache 14 and data cache 16, thus improving the speed of operation of the data processing system. Instruction cache 14 is further coupled to sequential fetcher 17, which fetches instructions from instruction cache 14 during each cycle for execution. Sequential fetcher 17 stores sequential instructions within instruction queue 19 for execution by other execution circuitry within processor 10. Dispatch unit 20 retrieves instructions from within instruction queue 19 and forwards the instruction to an associated one of execution circuitry. Branch instructions are also transmitted to a branch processing unit (BPU) 18 for execution. BPU 18 is a branch prediction and fetch redirection mechanism.

In the depicted embodiment, in addition to BPU 18, the execution circuitry of processor 10 comprises multiple execution units, including fixed-point unit (FXU) 22, load/store unit (LSU) 28, and floating-point unit (FPU) 30. As is well known by those skilled in the art, each of execution units FXU 22, LSU 28, and FPU 30 executes one or more instructions within a particular class of sequential instructions during each processor cycle. For example, FXU 22 performs fixed-point mathematical operations such as addition, subtraction, ANDing, ORing, and XORing utilizing source operands received from specified general purpose registers (GPRs) 32. Following the execution of a fixed point instruction, FXU 22 outputs the data results of the instruction to GPR rename buffers 33, which provide temporary storage for the result data until the instruction is completed by transferring the result data from GPR rename buffers 33 to one or more of GPRs 32. Conversely, FPU 30 performs floating-point operations, such as floating-point multiplication and division, on source operands received from floating-point registers FPRs 36. FPU 30 outputs data resulting from the execution of floating-point instructions to selected FPR rename buffers 37, which temporarily store the result data until the instructions are completed by transferring the result data from FPR rename buffers 37 to selected FPRs 36. As its name implies, LSU 28 executes floating-point and fixed-point instructions which either load data from memory (i.e., either data cache 16, a lower level cache, or main memory) into selected GPRs 32 or FPRs 36 or which store data from a selected GPRs 32 or FPRs 36 to memory. Completion unit 40 informs IFU 17 when execution of a particular instruction or operation is completed.

Processor 10 employs both pipelining and out-of-order execution of instructions to further improve the performance of its superscalar architecture. Accordingly, instructions can by executed by FXU 22, LSU 28, and FPU 30 in any order as long as data dependencies are observed. In addition, instructions are processed by each of FXU 22, LSU 28 and FPU 30 at a sequence of pipeline stages. As is typical of high performance processors, each instruction is processed at five distinct pipeline stages, namely, fetch, decode/dispatch, execute, finish and completion.

During the fetch stage, sequential fetcher 17 retrieves one or more instructions associated with one or more memory addresses from instruction cache 14. Sequential instructions fetched from instruction cache 14 are stored by sequential fetcher 17 within registers such as instruction queue 19. Additionally, sequential fetcher 17 also forwards branch instructions from within the instruction stream to BPU 18 for execution.

BPU 18 includes a branch prediction mechanism (hardware), which in one embodiment comprises a dynamic prediction mechanism such as a branch history table, that enables BPU 18 to speculatively execute unresolved conditional branch instruction s by predicting whether the path will be taken. Alternatively, in other embodiments of the present invention, a static, compiler-based prediction mechanism is implemented.

According to one embodiment, a bifurcated instruction pre-fetch unit is also provided within processor 10. The instruction pre-fetch unit comprises pre-fetch request engine 50 and pre-fetch address/data buffer 51. As illustrated in FIG. 2, pre-fetch request engine 50 is coupled between I-Cache 14 and BIU 12 via request interconnect, while pre-fetch address/data buffer 51 is coupled between I-Cache 14 and BIU 12 via addr/data return interconnect. The pre-fetch request engine 50 receives signals (triggers), which assist in the determination of when to switch processing from one thread to another. These signals/triggers include: a thread switch signal, an I-Cache miss, a D-cache miss, a decoded signal for software pre-fetch, etc. Counters are maintained in the pre-fetch request engine 50 and utilized as described below in the description of FIGS. 3A and 3B. In an alternate embodiment, component parts of the instruction pre-fetch unit exists within the instruction fetch unit 17. Likewise, other configurations may be possible, utilizing similarly featured components within a processor to achieve the same functional results and it is contemplated that all such configurations fall within the scope of the present invention.

The present invention provides a pre-fetching mechanism for handling instruction fetch addresses that are predicted to potentially result in a miss at the instruction cache. The instruction pre-fetch mechanism helps the instruction fetcher 17 to request instructions from memory before the instruction fetch mechanism misses in the instruction cache. When the instruction fetch addresses changes the path of fetching, the instruction pre-fetch adapts quickly. The result is that by the time the instruction fetch address misses in the cache, the instructions are likely to be found in the next level of buffers or caches and the fetch does not have to be conducted at the memory thus reducing latency of the operation and improving processor efficiency.

Figure 3A:
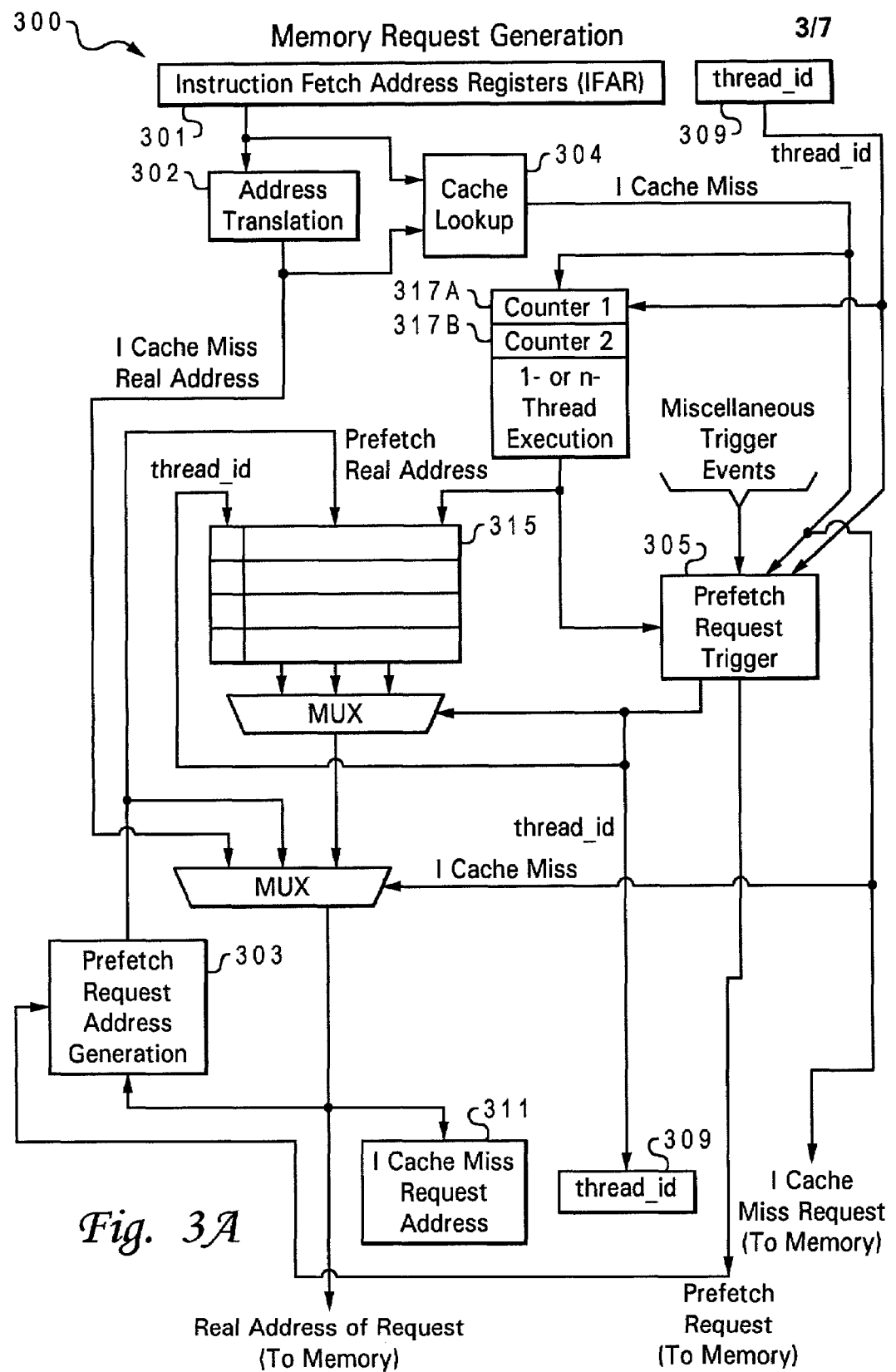
FIGS. 3A and 3B are block diagrams illustrating the components and logic structure of the multi-threaded pre-fetching mechanism for pre-fetching instructions of a multithreaded program in accordance with a preferred embodiment of the present invention.
Figure 3B:
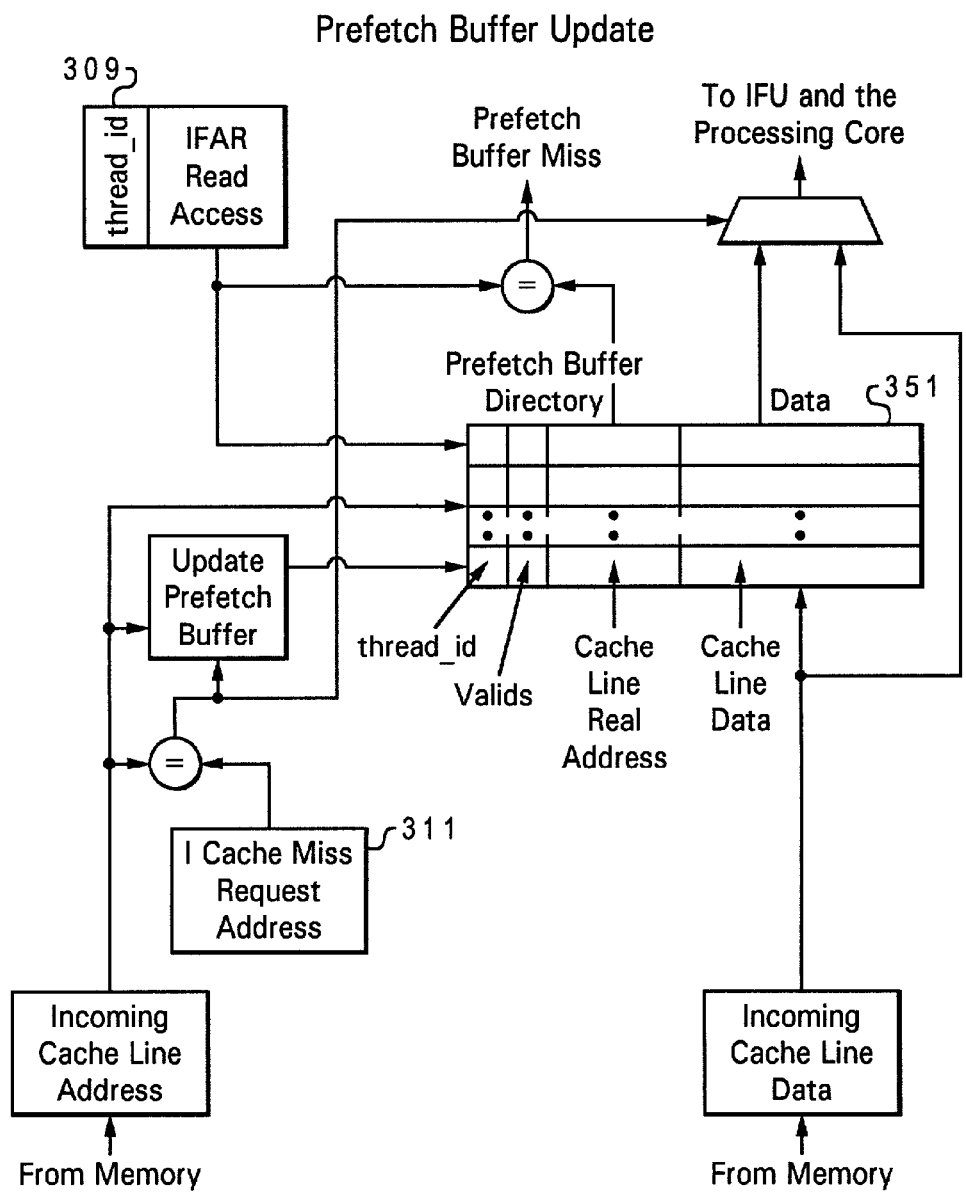

Implementation of the invention involves the utilization of additional logic (i.e., the hardware and software enabled structures) to monitor instruction fetching and instruction execution characteristics and direct the pre-fetching scheme of the invention. FIGS. 3A, 3B illustrate high level representations of the pre-fetching mechanism including logic components utilized and interconnections between the logic components.

Instruction pre-fetch unit (PFU) 300 is located between the instruction fetcher 17 and a lower level cache (such as an L2 or L3 cache). The primary components include pre-fetch predictor logic, two counters (or counting mechanisms) 317A, 317B, and a pre-fetch buffer (PFB) 315. Other logic components, such as MUXes, etc. are utilized to couple these components along with other components of processor to complete the functional features provided by the invention.

Pre-fetch request address generator 303 is a pre-fetch predictor that tracks the instruction fetcher 17 and requests instructions from lower level cache (or memory) before the instruction fetcher 17 may request them. Generation of the pre-fetch request address involves utilization of an address translation mechanism 302 and cache look up logic 304 coupled to instruction fetch address register (IFAR) 301. Pre-fetch request trigger 305 initiates the pre-fetch request address generator 303 when a trigger event occurs. Thus, generation of the pre-fetch request occurs in response to the pre-fetch request trigger 305 in obtaining an input identified with one or more of the following events: an I-Cache miss on the current thread, a D-Cache miss on the current thread, a software directed pre-fetch, a value of accuracy for the branch prediction, and a thread change mechanism for the instruction fetcher 17. The pre-fetch request trigger 305 initiates the issuance of the pre-fetch address by pre-fetch request address generator 303 and also provides a thread ID 309 to accompany the request. The thread ID 309 is provided to the pre-fetch request trigger 305 from the thread counter 317B described below.

A memory request counter 317A is associated with the trigger mechanism 305 and is utilized to count the consecutive memory requests on a particular thread. Thus, the memory request counter 317A tracks the number of threads in the last N (e.g., one thousand) cycles (or memory requests). The counter is reset whenever the context changes. During execution, when the counter 317A reaches a preset threshold value, the instruction fetch is classified as being in the single-threaded mode.

In the preferred embodiment, a second counter, thread counter 317B, is utilized to track the number of instructions executed within each thread. In one embodiment, thread counter 317B is an array of counters, with one counter dedicated to each thread, and which counts the number of instructions executed within that specific thread. Collectively, both counters 317A, 317B provide an indication to the processor whether to devote the resources within the IFU mainly for single thread execution or to share them among multiple threads indicated by the thread counter 317B. Both counters 317A, 317B are reset when a new I-Cache miss request is sent to memory.

The memory request address selection is performed utilizing the trigger mechanism 305 and the counters 317A, 317B described above to detect single or multithreaded execution. This address selection process allows the pre-fetching to begin from when a change of context (i.e., a change of a thread) is expected to occur during an instruction fetch. Notably, for block multithreading, the instruction fetch can occur from only one thread, and this simplifies the fetch operation with respect to fine grain multithreading.

Once a request is sent to the lower level cache (or memory), the next probable request address for that thread is generated and stored for later use. These pre-fetch requests help to prime the memory stages such that possible I-Cache misses for these addresses may find the cache line already on its way from lower level cache or memory towards pre-fetch buffer (PFB) 351 of FIG. 3B. According to the preferred embodiment, a table of pre-fetched real addresses 315 is maintained as illustrated in FIG. 3A. The table entries are accessed by reference to the associated thread identifier (ID). The architecture thus includes a pre-fetch buffer 351 in which the address tag, data, valid bits, and thread-id are maintained. Updates to the pre-fetch buffer 351 are completed from received information that includes: the active threads in use by the instruction fetch mechanism; the output of the counters, which indicates single-threaded or multithreaded execution; the thread-id for the data that is returned from the memory system; the address tags for the returning data; and the address tags and valid bits for the pre-fetch buffer entry.

Referring now to FIG. 3B, the PFB 351 (same as pre-fetch address/data buffer 51 of FIG. 2) and supporting logic structures are provided in greater detail. PFB 351 comprises multiple row entries with each entry having a thread ID, valid indicators, cache line real address, and cache line data. When a cache line returns, the lower level cache updates a row of the PFB 351 with this information as shown in FIG. 3B.

When instruction fetch address register (IFAR) 301 is waiting on this cache line, i.e., an I-Cache miss address 311 matches the returned cache line address, the instructions are immediately forwarded to the processor core (execution units). The cache line also updates the PFB 351 and I-Cache 14. In the absence of an immediate I-Cache miss, the data is stored in the PFB 351. The decision on whether to replace an entry in the PFB 351 and which entry to replace by the incoming cache line depends on the thread-id for the incoming line, the associativity of PFB 351, and the importance of the line in the PFB 351 (i.e., whether the PFB entry is yet to be fully written to I-Cache 14).

Thus, on a cache miss, the instructions are supplied by the PFB 351 if the cache line exists within the PFB 351. If the IFAR accesses the cache line, the cache line is considered important enough to be written to the I-Cache. Finally, the buffer allocation for threads is governed by the mode determination for single or multithreaded execution 305 in FIG. 3A, and the details are discussed below in FIG. 4A.

The fine grain multithreading approach of the invention allows a simultaneous instruction fetch and issue from multiple threads. Simultaneous Multithreading (SMT) is one example of fine grain multithreading. The current invention is applicable to fine grain multithreading as well as block multithreading.

According to the preferred embodiment, memory request address generation is performed for an active thread for which the instruction fetch occurs and for one or more threads which are likely to be selected for execution (i.e., these selected threads are currently allocated some of the processor resources such as instruction and/or data caches, registers, buffers, instructions queues, branch arrays, etc.).

Figure 4A:
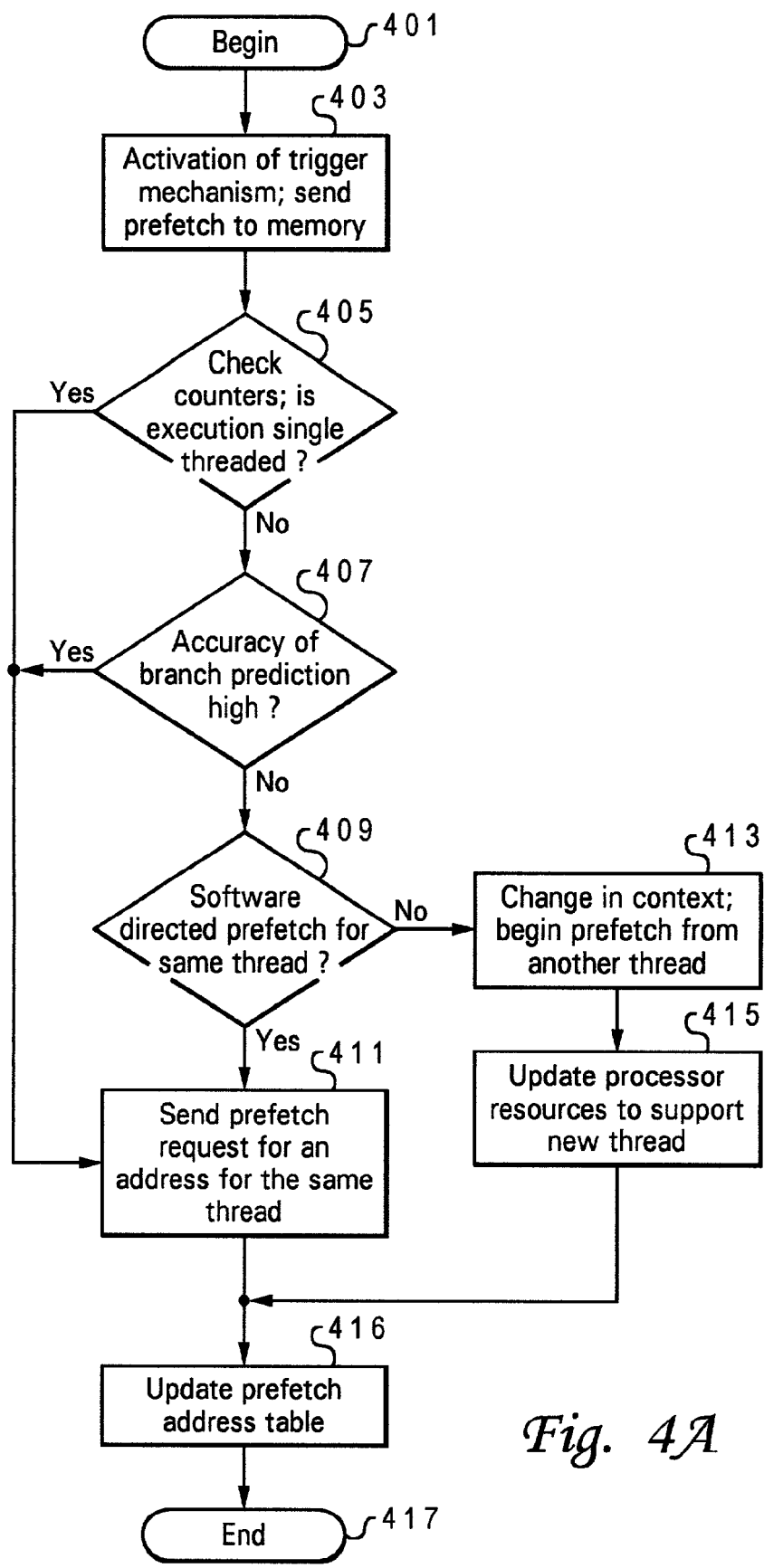
FIGS. 4A–4C are flow charts depicting the logic flow of the method of pre-fetching instructions of a multithreaded program in accordance with the implementation of the present invention.

FIG. 4A illustrates the process of pre-fetching instructions of a multithreaded program according to the invention. The process begins at block 401 and thereafter proceeds to block 403 which illustrates activation of the trigger mechanism to send a pre-fetch request to the memory system (i.e., the next level caches and/or the memory). A determination is made at block 405 whether the counters indicate that the execution is primarily a single-threaded one. If the counters indicate that the execution is primarily a single threaded one, a next determination is made at block 407 whether the branch prediction accuracy is reasonably high. Following, if the branch prediction accuracy is not reasonably high, a final determination is made as illustrated at block 409 whether the software directed pre-fetch asks for the same thread ID. When any one of the above determination steps provides a positive result, a pre-fetch request is sent unless it is first filtered out due to the presence of the line in the I-Cache.

According to the preferred embodiment, and as illustrated in block 411, the pre-fetch request is sent for an address for the same thread as that is being currently executed if any of the above three determinations results in an affirmative response. Otherwise, the pre-fetching mechanism assumes that a change of context (i.e., thread) may occur in the instruction fetch, and accordingly, begins a pre-fetch from a different thread as indicated in block 413.

The change of context/thread for instruction pre-fetching is initiated if the triggering mechanism indicates so. One major trigger to cause the triggering mechanism to indicate a change is when the counters indicate a multithreaded execution. The pre-fetching from a different thread is also initiated when on-core caches are missed. Similarly, when the branch prediction is not of high accuracy, or the target address is likely to be far (such as occurs with a new function call), a change of thread occurs for the pre-fetch.

According to the preferred embodiment, the new thread, for which the pre-fetch request is issued, already has some processor resources allocated to it. The new thread is selected from among the available threads based on age and relevance. Additionally, selection of the new thread is influenced by the indication received from the thread counter about the number of threads that are allocated to processor resources at a given time.

The change of context/thread for pre-fetching is also closely linked to the change of context/thread for the instruction fetch so that whenever the instruction fetch changes the course of execution to a new thread, the pre-fetching mechanism adapts right away. Returning now to FIG. 4A, once the new thread is selected, the various processor and other resources are updated to support the new thread as shown at block 415. The pre-fetch address table 315 is updated as indicated in block 416 and then the process ends as indicated at block 417.

The invention provides an address generation for a memory request (I-Cache miss and pre-fetch). With an I-Cache miss, i.e., when an instruction fetch address (IFAR) misses the instruction cache, the translated real address is sent to the memory as the request address for the demanded cache line. The tag to the memory system along with this address includes the thread-identifier, part of the effective page address from the IFAR, and other information such as whether the request is cache-inhibited.

For a pre-fetch request address, when a pre-fetch request is sent following a demand request (or on a cache miss), the tag for the pre-fetch request is left identical to that of the preceding demand request, with the exception of the real address of the requested cache line. The real address of the pre-fetch request is computed as follows. First, when next sequential address (NSA) pre-fetch algorithm is adopted, the real address is incremented by 1 after sending a demand request or a pre-fetch request for that thread-id (the number of outstanding pre-fetch requests issued after a demand request is implementation dependent and can be software-controlled). Second, the real address from the table of pre-fetch real addresses is chosen based on the thread ID. The thread ID is selected at the time of the change of the context/thread for instruction pre-fetching.

Figure 4B:
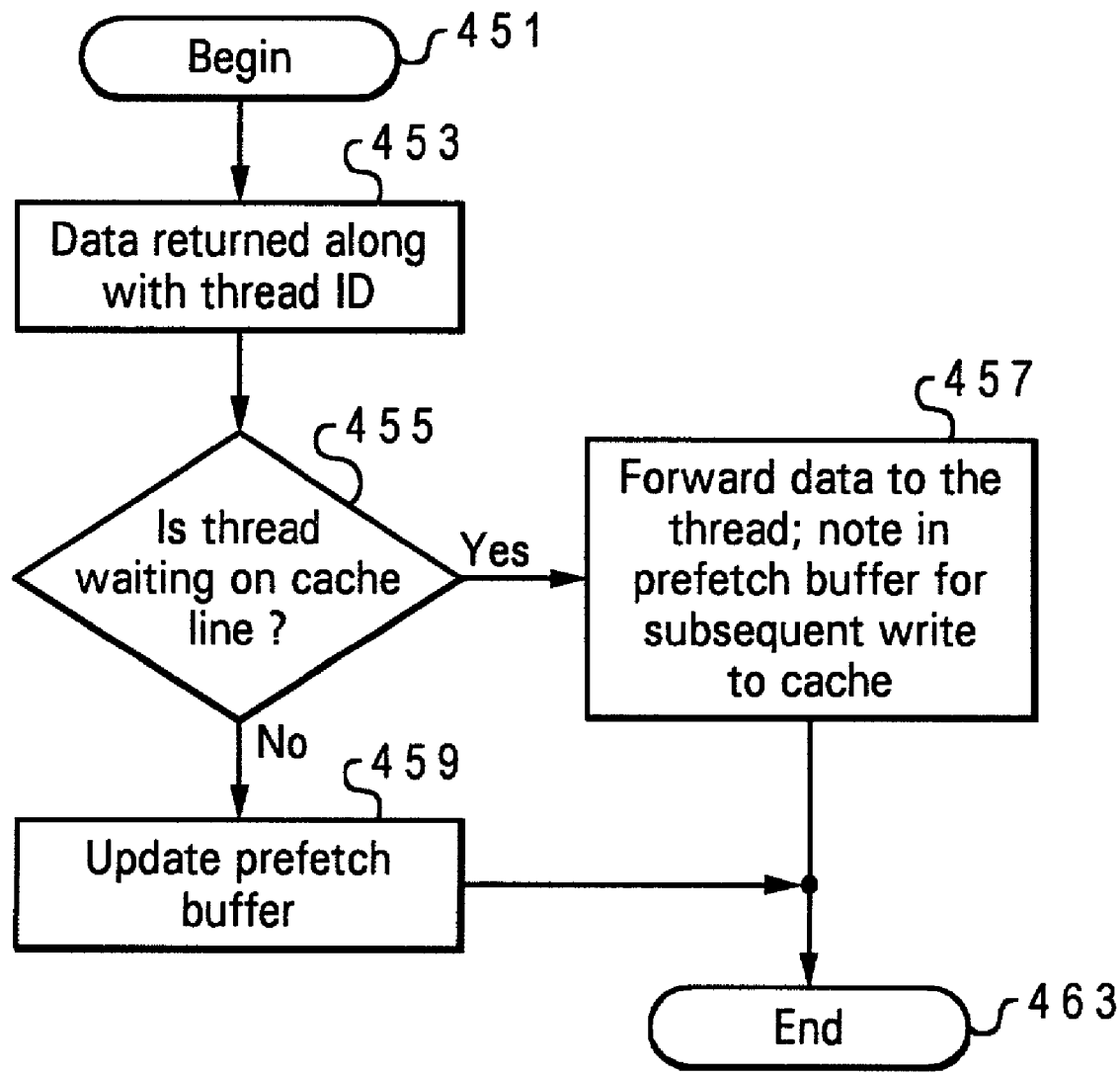

FIG. 4B illustrates the process of handling data that is returned from the memory system. The process begins at block 451 and then proceeds to block 453 where the memory system returns the data (cache line) along with the thread ID. A determination is made at block 455 whether there is a thread waiting on the cache line. When a particular thread is waiting on the cache line, the data is forwarded for that thread and is noted in the pre-fetch buffer for subsequent write to the cache as illustrated at block 457. If, however, no thread is waiting on the data returning from the memory system, the pre-fetch buffer is updated as indicated at block 459. Then the process ends as shown at block 463

The pre-fetch table is hashed as per the thread-id. For each thread at least one pre-fetch request address is maintained. In the preferred embodiment, the pre-fetch request address is computed immediately when the last demand or pre-fetch request for that thread is sent to the memory system. The old entries are replaced by the new entries when a write occurs.

Figure 4C:
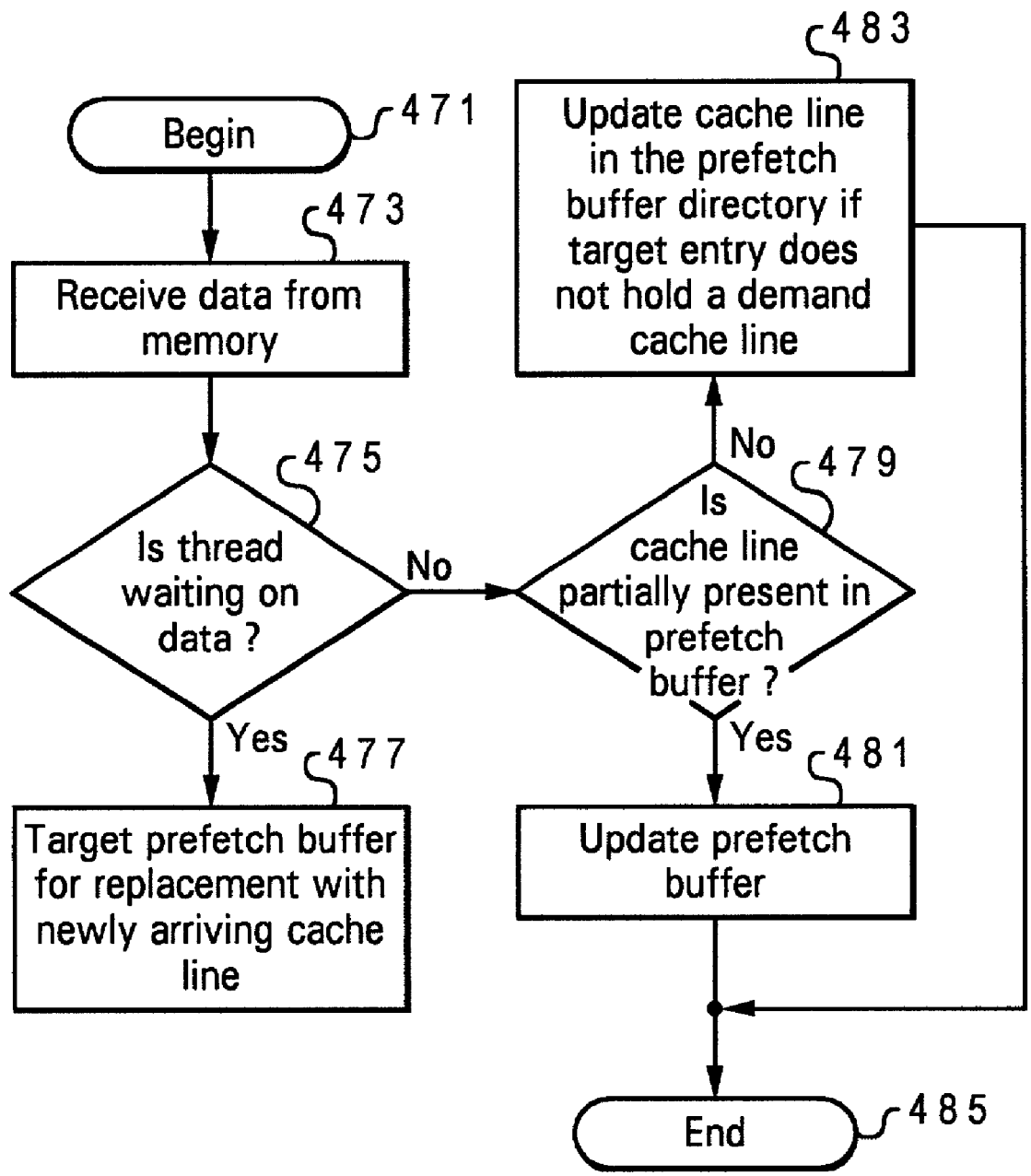

FIG. 4C illustrates the process of updating the pre-fetch buffer. The cacheable data sent by the memory system updates the pre-fetch buffer directory. The process begins at block 471 and then proceeds to block 473 where data is received from memory. A determination is made at block 475 whether a thread is waiting for that data (i.e., there is an outstanding demand data for that thread). When there is a thread waiting for the data, a pre-fetch buffer entry is targeted (typically a direct-mapped) for replacement with the newly arriving cache line as shown at block 477. If there is no thread waiting, however, then a next determination is made as shown at block 479 whether the incoming cache line is partially present in the pre-fetch buffer. If the incoming cache line is partially present in the pre-fetch buffer, then the pre-fetch buffer entry is updated as shown at block 481. Otherwise, the cache line is updated in the pre-fetch buffer directory if the target entry does not hold a demand cache line (i.e. a miss in I-Cache) as shown at block 483. Then the process ends as indicated at block 485.

For incoming cache line to be compared against a demand request as well as against a pre-fetch buffer entry, the real address and thread ID's are utilized. Moreover, for the pre-fetch buffer entry comparison, an additional comparison with effective address tags (for cache write address purpose) is necessary.

The invention takes advantage of the simplicity of data flow based multithreading in deciding when to initiate pre-fetch request, and does not require an on-chip runtime performance measurement scheme as other proposed schemes. The invention provides several advantages including: (1) the features of the invention meshes well with both single-threaded program execution as well as multithreaded program executions; (2) implementation of the invention does not require extensive hardware unlike other mechanisms that are dependent on measurements of memory access latencies to insert pre-fetch requests; (3) in a conventional multithreaded program execution, a change of context for the instruction fetch would occur before the pre-fetching from the new context. The invention goes a step further and initiates pre-fetches that speculate a change of context.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of pre-fetching instructions during multi-threaded program execution in a processor of a data processing system, said method comprising:

determining when an instruction associated with a particular thread is to be pre-fetched from a lower-level memory component, wherein said particular thread is one of multiple threads executing on said processor and said particular thread is proximate to being selected for execution; and pre-fetching said instruction from the lower-level memory component, wherein said instruction is fetched prior to a request for said instruction by an instruction fetch unit (IFU) of the processor that issues a request for said instruction during actual execution of said particular thread, and wherein said instruction is returned from the lower-level memory component to the upper processor level for reduced access latency when said request is issued and said instruction is tagged with an identifier (ID) of said particular thread to indicate that it is associated with said particular thread; and providing said instruction from the processor level rather than said lower-level memory component to an executing unit of said processor when said instruction is required during execution of said particular thread.

2. The method of claim 1, further comprising:

generating a pre-fetch request for said instruction, wherein said pre-fetch request is tagged with a thread identifier (ID);

issuing said pre-fetch request to the lower level memory component; and linking said thread ID to said instruction when said instruction is returned from said lower level memory component, whereby said instruction is identified as belonging to said particular thread.

3. The method of claim 1, further comprising initiating said generating step in response to a receipt of at least one trigger from among (1) a software directed pre-fetch, (2) a value of accuracy for the branch prediction, and (3) a thread change mechanism for an instruction fetcher of said processor.

4. The method of claim 3, wherein said processor comprises an instruction pre-fetch buffer, said method further comprising:
    determining whether execution of a thread is waiting on a return of said instruction;
    when execution of a thread is waiting on a return of said instruction, immediately forwarding said instruction to said thread execution, and marking said pre-fetch buffer for subsequent write to a higher level memory; and
    when there is no thread waiting on a return of said instruction, storing said instruction in said instruction pre-fetch buffer, wherein a later forwarding of said instruction to the execution units of the processor from the instruction pre-fetch buffer substantially eliminates a latency of retrieving said instruction from the lower level memory component.

5. The method of claim 4, further comprising selecting an entry of said pre-fetch buffer for replacement with a newly arriving instruction tagged with said thread ID.

6. The method of claim 1, wherein said generating step is initiated in response to a pre-defined trigger from among (1) an I-Cache miss on a current thread, (2) a D-Cache miss on a current thread, said method further comprising:
    comparing an address of a previous I-Cache miss with an address of said instruction; and
    immediately forwarding said instruction to said execution units when the addresses match.

7. The method of claim 1, further comprising:
    determining when a switch from executing a first thread to executing a second thread is about to occur;
    issuing said pre-fetch request tagged with a tag of said second thread, wherein said pre-fetch request is issued prior to a normal fetch request issued by the processor for instructions of the second thread when the second thread is scheduled for execution, wherein said pre-fetch quest is issued only when said instruction is not within an I-cache of the processor;
    when said instruction, tagged with a tag of said second thread returns prior to issuance of said normal request, storing said instruction in a pre-fetch buffer; and
    when said instruction, tagged with the tag of the second thread returns after issuance of said normal request, which misses at the I-cache of the processor, immediately forwarding said instruction to the execution units of said processor.

8. The method of claim 1, further comprising:
    tagging said pre-fetch request with a tag of a request issued prior to said pre-fetch request;
    calculating a real address of said pre-fetch request by incrementing a current real address of a last executed instruction of the thread by 1; and
    selecting said address from said pre-fetch buffer according to said thread identifier.

9. The method of claim 8, further comprising selecting a different thread identifier when a change of a thread context for instruction pre-fetching is made.

10. In a data processing system having lower level memory and a multithreaded processor with instruction fetch unit, a pre-fetch buffer, and execution units, a method comprising:
    determining when an instruction associated with a particular thread is to be pre-fetched from a lower-level memory, wherein said particular thread is one of multiple threads executing on said processor;
    pre-fetching said instruction from the lower-level memory, wherein said instruction is tagged with an identifier (ID) of said particular thread to indicate that it is associated with said particular thread;
    determining whether an incoming instruction is partially present in said pre-fetch buffer;
    responsive to said instruction being partially present in said pre-fetch buffer, updating said pre-fetch buffer with said instruction; and
    providing said instruction from the pre-fetch buffer rather than said lower-level memory component to an executing unit of said processor when said instruction is required during execution of said particular thread, wherein said instruction is immediately forwarded to the execution unit when execution of a thread is waiting on a return of the instruction from the lower level memory.

11. A data processing system having at least a processor and a memory connected via an interconnect, wherein said processor includes:
    an instruction fetcher;
    an instruction cache (I-cache);
    a plurality of execution units;
    a plurality of buses providing interconnection amongst said instruction fetcher, said instruction cache and said plurality of execution units, and to a lower level memory; and
    logic components for pre-fetching instructions from a multithreaded application, wherein instructions from a particular thread among said multithreaded application are pre-fetched and provided during execution of said particular thread by said plurality of execution units, said logic including logic for:
    determining when an instruction associated with a particular thread is to be pre-fetched from a lower-level memory, wherein said particular thread is one of multiple threads executing on said processor;
    pre-fetching said instruction from the lower-level memory, wherein said instruction is tagged with an identifier (ID) of said particular thread to indicate that it is associated with said particular thread; and
    providing said instruction from processor level buffer rather than said lower-level memory to an executing unit of said processor when said instruction is required during execution of said particular thread, wherein latency of forwarding said instruction to said execution units is substantially reduced.

12. The data processing system of claim 11, wherein said logic components comprise:
    an instruction pre-fetch trigger that is activated in response to a receipt of at least one input signal from among an I-Cache miss on a current thread, a D-Cache miss on a current thread, a software directed pre-fetch, a value of accuracy for a branch prediction; and
    a thread tracking mechanism for an instruction fetcher of said processor, and which initiates generation of pre-fetch requests.

13. The data processing system of claim 12, wherein said thread tracking mechanism includes a pair of counters associated with said instruction pre-fetch trigger, said pair of counters comprising a first counter that tracks a number of consecutive memory requests on a particular thread and a second counter that tracks a number of threads accessed during a pre-determined number of cycles.

14. The data processing system of claim 13, wherein said second counter is an array having a plurality of counters that each tracks a number of instructions executed within a particular one of said number of threads.

15. The data processing system of claim 13, wherein said logic components further comprise a pre-fetch request generator that provides an address and thread identifier of said pre-fetch request responsive to an activation of said instruction pre-fetch trigger.

16. The data processing system of claim 15, wherein said processor further comprises:
   a pre-fetch buffer in which an instruction returned by said pre-fetch request is stored until required by its associated; and
   logic that determines when a returned instruction is required by an executing thread and immediately forwards said instruction to the executing thread waiting for a return of said instruction, wherein said logic stores said instruction in said pre-fetch buffer when no thread is waiting for a return of the instruction.

17. The data processing system of claim 16, further comprising:
   an instruction pre-fetch trigger that is activated in response to a receipt of at least one input signal from among an I-Cache miss on a current thread and a D-Cache miss on a current thread; and
   wherein said logic compares an address of a previous I-Cache miss with an address of said instruction and immediately forwards said instruction to said execution units when said addresses match.

18. The data processing system of claim 13, further comprising:
   logic for determining whether an incoming instruction is partially present in said pre-fetch buffer; and
   responsive to said instruction being partially present in said pre-fetch buffer, updating said pre-fetch buffer with said instruction.

19. The data processing system of claim 13, further comprising logic for:
   determining when a switch from executing a first thread to executing a second thread is about to occur;
   issuing said pre-fetch request tagged with a tag of said second thread, wherein said pre-fetch request is issued prior to a normal fetch request issued by the processor for instructions of the second thread when the second thread is scheduled for execution, wherein said pre-fetch quest is issued only when said instruction is not within an I-cache of the processor;
   when said instruction, tagged with a tag of said second thread returns prior to issuance of said normal request, storing said instruction in a pre-fetch buffer; and
   when said instruction, tagged with the tag of the second thread returns after issuance of said normal request, which misses at an I-cache of the processor, immediately forwarding said instruction to the execution units of said processor.

* * * * *

UNITED STATES PATENT AND TRADEMARK OFFICE
CERTIFICATE OF CORRECTION

| | | |
|---|---|---|
| PATENT NO. | : 6,965,982 B2 | Page 1 of 1 |
| APPLICATION NO. | : 09/895227 | |
| DATED | : November 15, 2005 | |
| INVENTOR(S) | : Shashank Nemawarkar | |

It is certified that error appears in the above-identified patent and that said Letters Patent is hereby corrected as shown below:

In Claim 16, at column 13, line 16, between "associated" and "and" insert --thread;--.

Signed and Sealed this

Eighth Day of May, 2007

JON W. DUDAS
*Director of the United States Patent and Trademark Office*